(12) United States Patent
Sturm et al.

(10) Patent No.: US 10,173,238 B2
(45) Date of Patent: Jan. 8, 2019

(54) APPLICATOR

(71) Applicant: Airbus Operations GmbH, Hamburg (DE)

(72) Inventors: Thomas Sturm, Wiedenzhausen (DE); Helmut Huber, Axtbrunn (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 15/288,516

(22) Filed: Oct. 7, 2016

(65) Prior Publication Data

US 2017/0095831 A1    Apr. 6, 2017

Related U.S. Application Data

(63) Continuation of application No. PCT/EP2015/057365, filed on Apr. 2, 2015.

(30) Foreign Application Priority Data

Apr. 9, 2014  (DE) .................... 20 2014 101 661 U
Sep. 26, 2014 (DE) .................... 20 2014 104 613 U

(51) Int. Cl.
*B05C 9/02* (2006.01)
*B29C 59/04* (2006.01)
(Continued)

(52) U.S. Cl.
CPC .............. *B05C 9/02* (2013.01); *B05C 1/0808* (2013.01); *B05C 9/12* (2013.01); *B05D 3/067* (2013.01);
(Continued)

(58) Field of Classification Search
CPC .... B05C 1/08; B05C 9/02; B05C 9/12; B05C 1/0808; B25J 11/0075; F15D 1/0085;
(Continued)

(56) References Cited

U.S. PATENT DOCUMENTS 4,907,765 A * 3/1990 Hirschel ................. B64C 21/10
                                                                          244/130
5,480,596 A   1/1996 Okubo et al.
(Continued)

FOREIGN PATENT DOCUMENTS

CN      1863665 A      11/2006
CN    102463293 A       5/2012
(Continued)

OTHER PUBLICATIONS

International Search Report for Application No. PCT/EP2015/057365 dated Jul. 13, 2015.
(Continued)

*Primary Examiner* — Laura Edwards
(74) *Attorney, Agent, or Firm* — Jenkins, Wilson, Taylor & Hunt, P.A.

(57) ABSTRACT

An applicator for application onto and embossing microprofiling of a fluidic medium on a substrate, in particular in the aerospace sector, and a corresponding application device having such an applicator. The applicator has a circumferentially moving die that has an embossing profile, a press for the die and a stabilizing device, in particular a hardening device, for the applied medium. In addition, the applicator has a hollow support body, surrounded by the die at a distance forming a gap, the press being arranged in the gap. The application device has, in addition to the applicator, a handling device for a relative movement between the applicator and a workpiece.

26 Claims, 12 Drawing Sheets

(51) Int. Cl.
*B05D 3/06* (2006.01)
*B64C 21/10* (2006.01)
*F15D 1/00* (2006.01)
*B05C 1/08* (2006.01)
*B29C 59/02* (2006.01)
*B05C 9/12* (2006.01)
*B25J 11/00* (2006.01)
*B29C 35/08* (2006.01)
*B05D 5/02* (2006.01)
*B05D 1/40* (2006.01)
*B29C 43/36* (2006.01)

(52) U.S. Cl.
CPC ........... *B25J 11/0075* (2013.01); *B29C 59/02* (2013.01); *B29C 59/046* (2013.01); *B64C 21/10* (2013.01); *F15D 1/0085* (2013.01); *B05D 1/40* (2013.01); *B05D 5/02* (2013.01); *B29C 2035/0827* (2013.01); *B29C 2043/3613* (2013.01); *B29C 2059/023* (2013.01); *B64C 2230/26* (2013.01); *F15D 1/0035* (2013.01); *Y02T 50/166* (2013.01)

(58) Field of Classification Search
CPC ... F15D 1/0035; B64C 21/10; B64C 2230/26; B28B 5/10; B29C 59/02; B29C 59/04; B29C 2043/3613; B29C 2059/023; B29C 2035/0827; B41F 17/006; B41F 17/00; B41F 15/0895; B41F 16/008; B41F 17/001; B05D 3/067; B05D 1/40; B05D 5/02; Y02T 50/166
USPC ....... 118/304, 211, 212; 425/174.4, 385, 62; 101/35–44, 4–11
See application file for complete search history.

(56) References Cited

U.S. PATENT DOCUMENTS

| | | | | |
|---|---|---|---|---|
| 7,676,298 | B2* | 3/2010 | Beehag | B29C 59/02 700/154 |
| 2002/0098257 | A1 | 7/2002 | Ikeda et al. | |
| 2004/0219246 | A1* | 11/2004 | Jeans | B29C 39/148 425/174.4 |
| 2007/0110911 | A1* | 5/2007 | Steiger | B05B 13/0447 427/424 |
| 2010/0272845 | A1* | 10/2010 | Yamada | B29C 59/04 425/335 |
| 2011/0005412 | A1* | 1/2011 | Fujii | B29C 59/04 101/216 |
| 2012/0070623 | A1 | 3/2012 | Hayashibe et al. | |
| 2012/0274004 | A1* | 11/2012 | Kobrin | G03F 1/50 264/496 |

FOREIGN PATENT DOCUMENTS

| | | |
|---|---|---|
| CN | 103316819 A | 9/2013 |
| CN | 103384918 A | 11/2013 |
| DE | 102006004644 | 8/2007 |
| DE | 102011120498 A1 | 6/2013 |
| EP | 2650922 | 10/2013 |
| EP | 2137053 | 11/2013 |
| WO | WO 2008098719 | 8/2008 |

OTHER PUBLICATIONS

IPRP with Written Opinion for Application No. PCT/EP2015/057365 dated Oct. 12, 2016.
German Search Report for German Application No. 202014101661.9 dated Dec. 19, 2014.
Chinese Office Action for Chinese Application No. 201580030435.3 dated May 30, 2018.

* cited by examiner

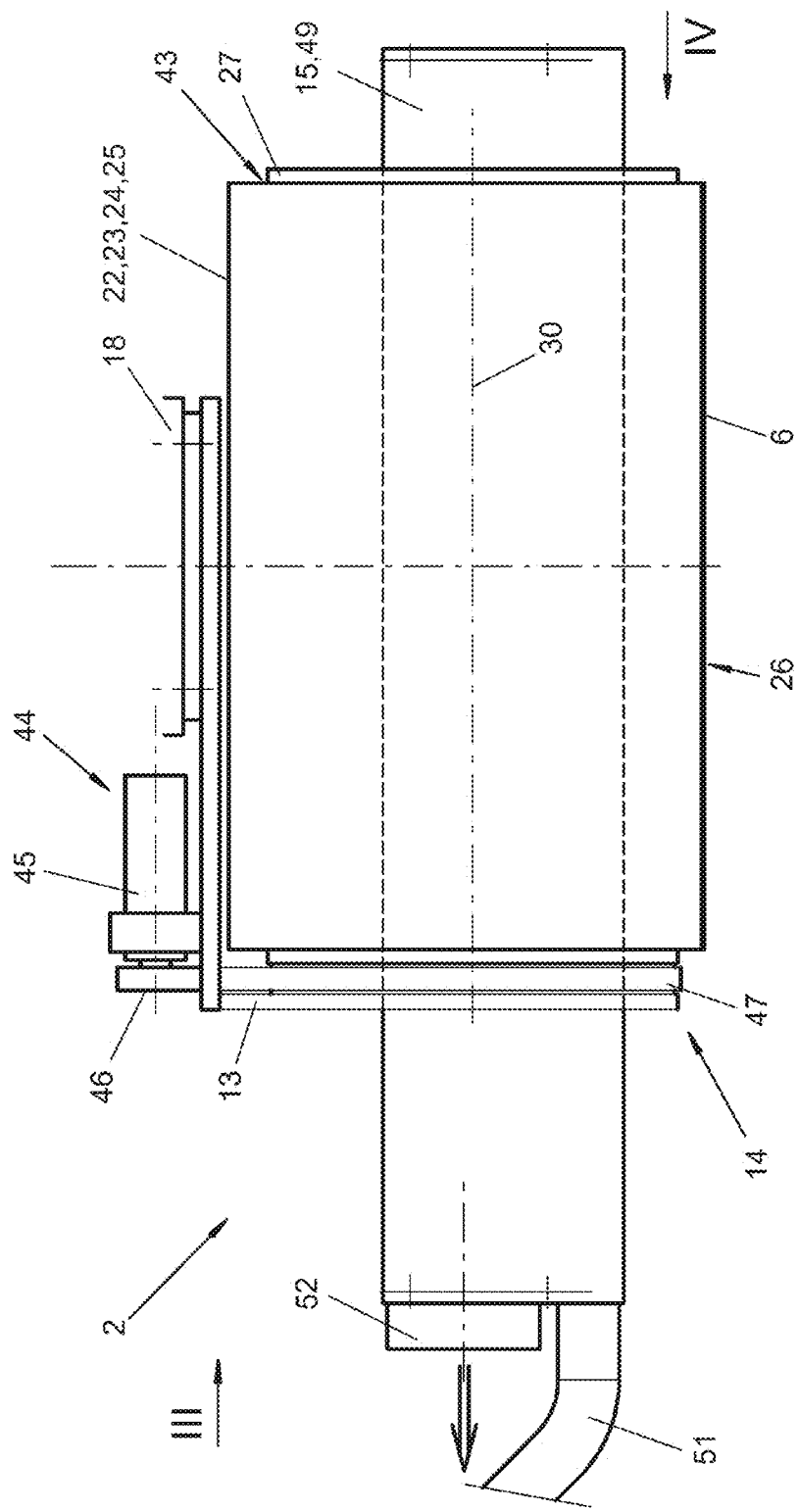

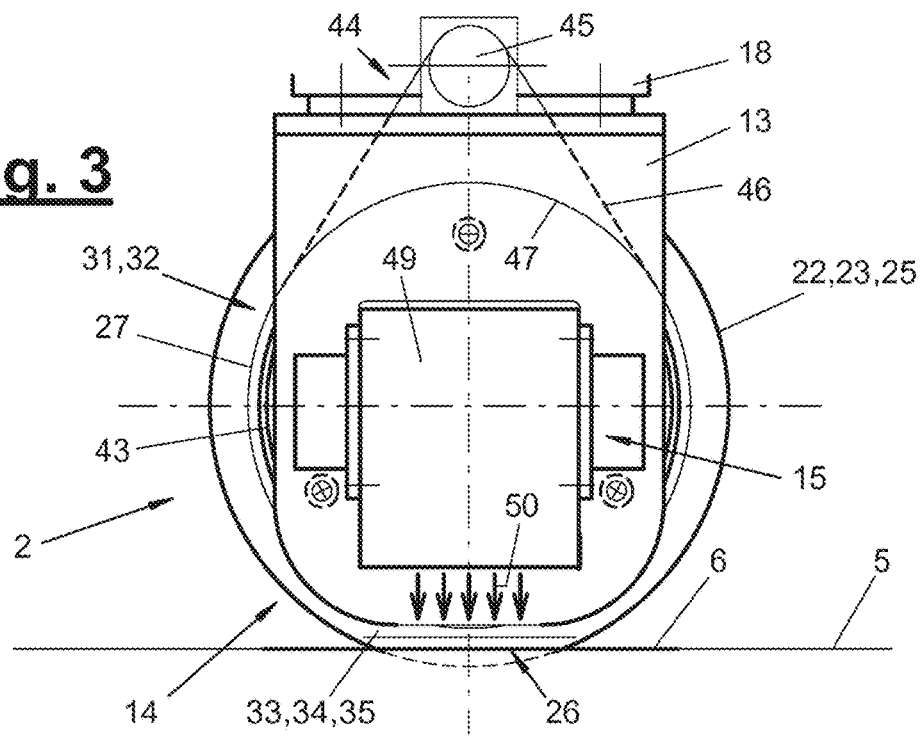
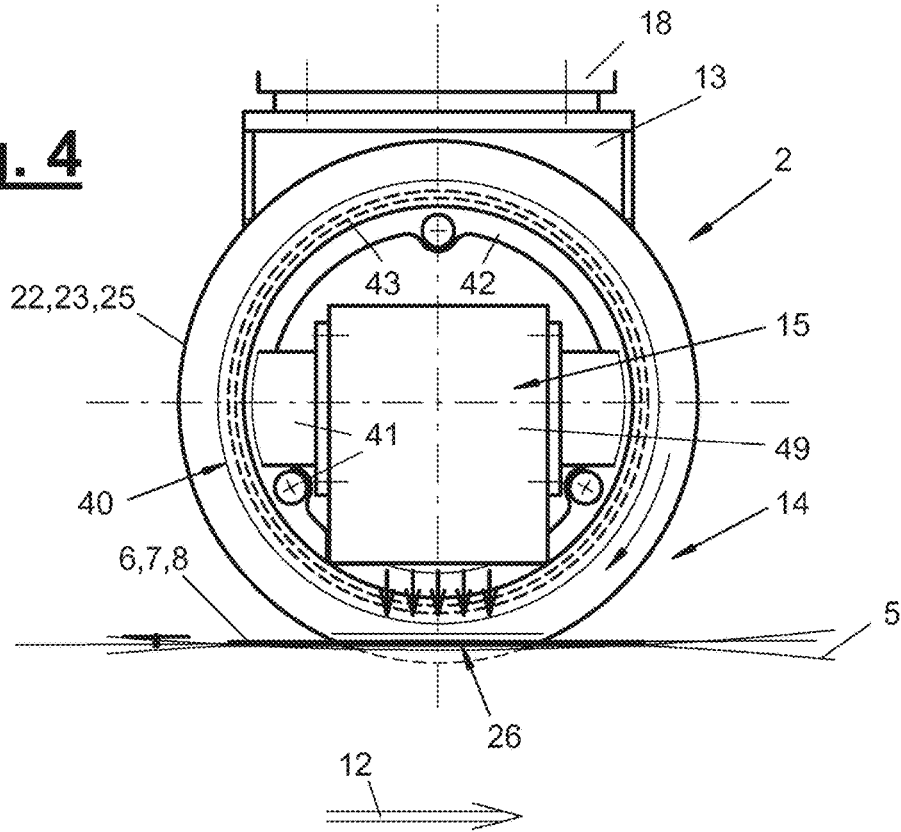

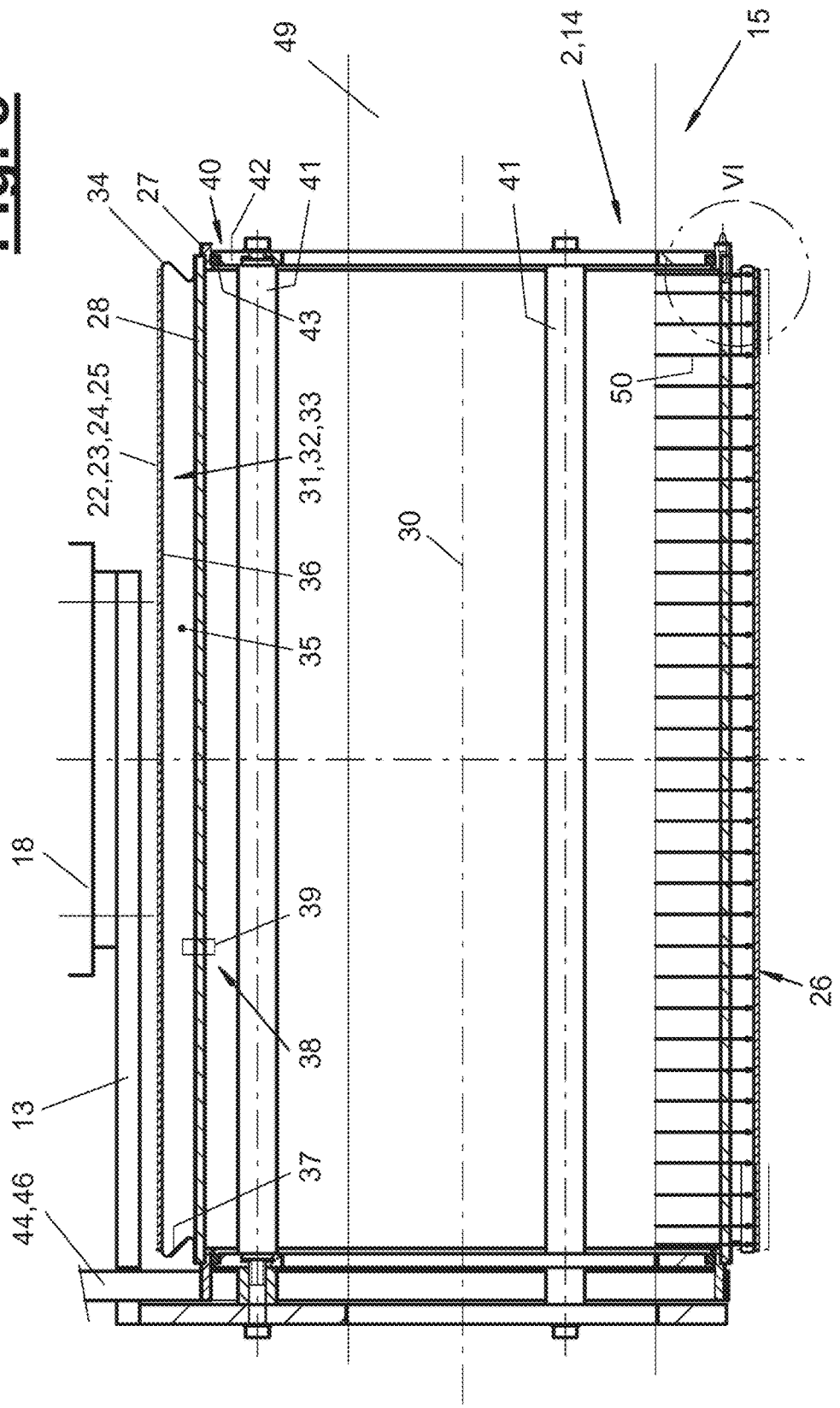

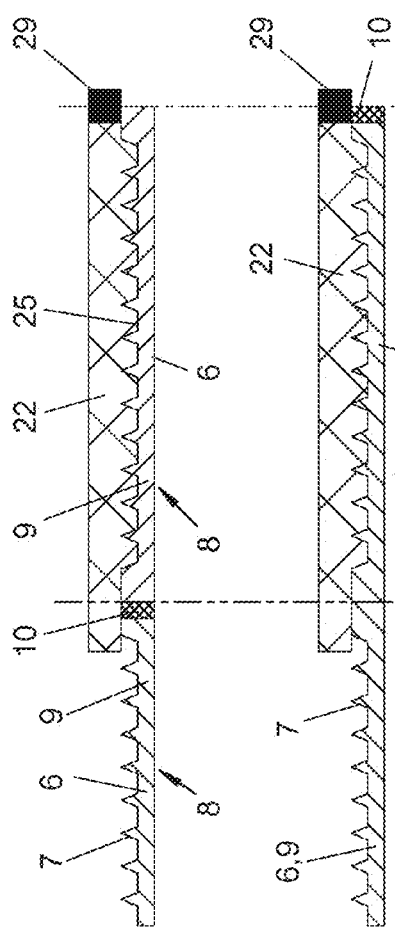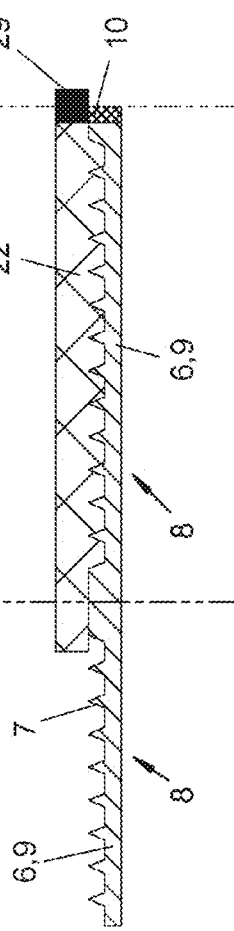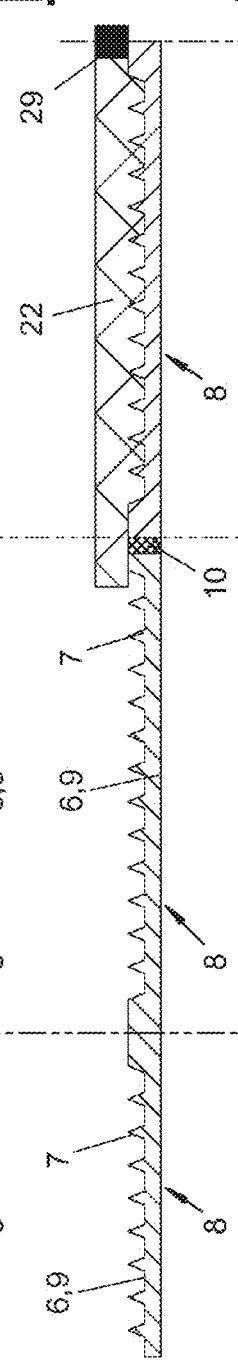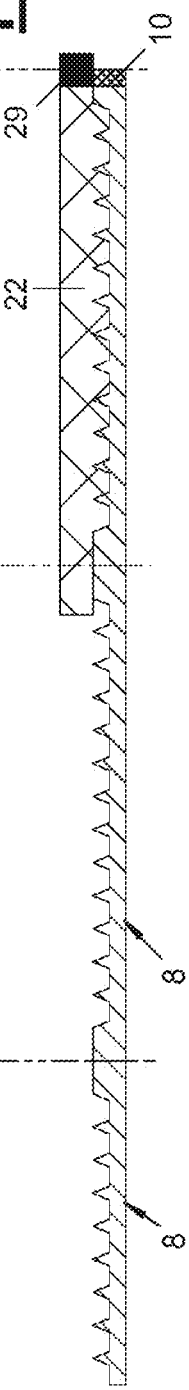

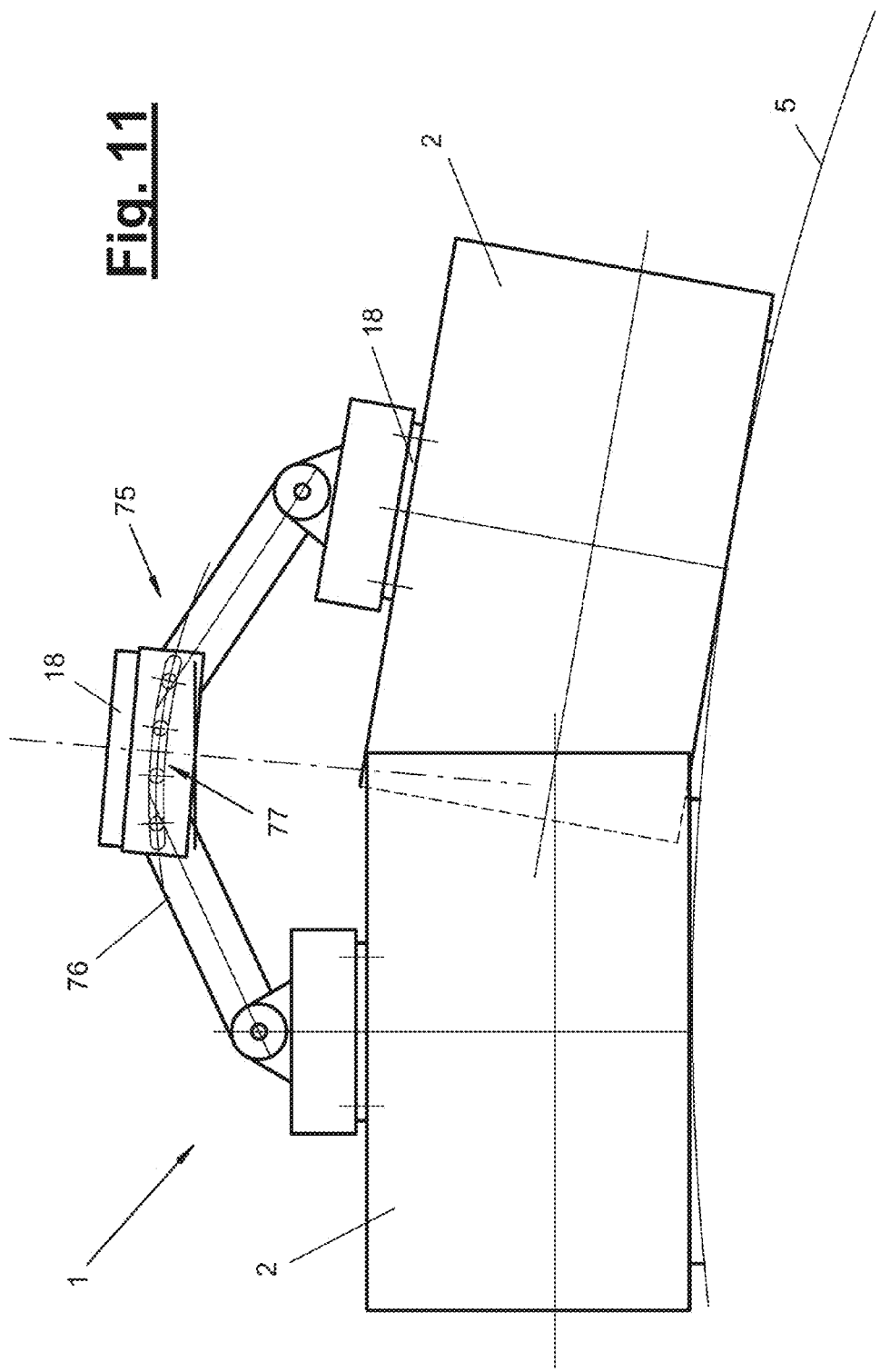

APPLICATOR

CROSS-REFERENCE TO RELATED APPLICATIONS

This application is a continuation of International Application No. PCT/EP2015/057365 filed Apr. 2, 2015, which claims priority to German Patent Application No. 20 2014 101 661.9 filed Apr. 9, 2014 and German Patent Application No. 20 2014 104 613.5 filed Sep. 26, 2014, the entire disclosures of which are incorporated by reference herein.

TECHNICAL FIELD

The disclosure herein relates to an applicator and to a method for the application onto and the embossing microprofiling of a fluidic medium on a surface, and in particular for the application and the embossing microprofiling of a fluidic medium in the aerospace sector, wherein the applicator has a circumferentially moved die having an embossing profile, a press for the die and a stabilizing device, in particular a hardening device, for the applied medium.

BACKGROUND

Such an applicator is known from DE 10 2006 004 644 A1. The applicator applies a hardenable varnish on a surface of a substrate and in doing so also embosses it on its surface, whereby the varnish is provided with a microstructure. Such a varnish having a microstructure is also called riblet. The applicator has a circumferentially movable die having an embossing profile and is pressed by a robot against the surface, in particular the so-called substrate surface, and moved along the latter. The applicator has a roller inflatable by pressure on the outer circumference of which the die is firmly mounted and tensioned by the gas pressure. A hardening device directed towards the pressing area is arranged in the roller.

SUMMARY

It is an object of the present disclosure to provide an improved applicator and application technique.

The application technique, i.e. the applicator and the application process as well as an application device, have several advantages. The application technique can be used to apply the fluidic medium, for example, a hardenable varnish, with tighter tolerances regarding layer thickness and the microstructure created by embossing. The durability of the applied medium and the technical or physical effect of the microstructure can be considerably improved. Such a microstructure on a varnish can for example provide for reduced air resistance on an aircraft skin and for substantial fuel savings. The more precise the microstructure can be defined and formed, the greater the achievable effects.

The applicator with the hollow support body makes for a better and more accurate mounting and guidance of the die, improving the application of the fluidic medium effected by the die. In particular, exact edges of the fluidic medium applied in strips can be formed. This ensures an optimum connection of adjacent application strips.

The applicator also provides a uniform contact pressure of the die to the surface in the pressing area. Varnish being pressed out at the edges of the die can be prevented, whereby the sharp edges are formed on the edge of the die. The applicator also allows for a substantially improved conformability of the die in the pressing area to the, in many cases non-planar, contour of the surface. In particular, convex and concave curvatures of the substrate can be compensated for and evenly coated with the embossed medium. Such contours occur, for example, on aircraft and their outer skins in the fuselage area and on the wings.

In the applicator, the die has a longer service life and durability than in those of the prior art. The embossing profile can be arranged on the outside of the die material. Alternatively, it can be attached to a thin-walled and bending elastic coating on the outside of the die material. Such a coating, for example also in the form of a film, can result in a significantly longer service life and can consist of or comprise glass, for example, or other suitable materials. This also leads to an extended service life of the die. The die can possibly also be made of a thin-walled, bending elastic glass body having an embossing profile. The die can also be replaced if required.

The formation of the applicator on the support body and the press arranged in the gap is of particular advantage for an exact guidance and positioning of the die. In addition it facilitates replacing the dies. This can in particular be automated.

The applicator can comprise an integrated stabilizing device, which makes for stabilization, in particular hardening, of the fluidic medium applied on the surface and of the embossed microstructure. The stabilizing device, in particular as hardening device, can be designed in different variants. It may be located in or on a preferably hollow support body and pressurizes the medium applied just then in the pressing area of the die. An appropriate handling device can be used to adapt the applicator having the die to the surface, resulting in a planar pressing area. In this pressing area, the stabilizing device acts with an emitted stabilizing agent, for example UV light, and, for example, hardens the applied medium. In doing so, the size of the planar pressing area can be adapted to the stabilizing or hardening behavior of the medium, in particular in regard to its extent in the process or feed direction. In this planar pressing area, the die including its embossing profile is pressed against the surface and the applied medium. Thereby, during stabilization or hardening the microstructure of the applied medium is optimally protected and fixed.

In the preferred embodiment the support body is rotatably supported while being connected in a rotationally locked manner to the die at its outer cover area. The rotationally locked connection can be provided by the press, which is preferably formed as a pressure pad. The pressing force can be controlled or regulated by an adjusting device. It can, on one hand, be adapted to the operational requirements and to the pressing surface, the form of which is advantageous to the process. On the other hand, it can be significantly reduced to facilitate a die change.

The die may advantageously be circumferentially driven at the applicator using its own drive. This may be effected indirectly via a drive of the rotary support body and its rotationally locked connection with the die. Alternatively, the die may have a direct drive. Due to its own drive, the rotational movement of the die can be influenced in addition to the rolling movement of the die caused by the applicator feed. To this end, the drive can be suitably controlled or regulated. This drive assembly has independent inventive significance and can also be combined in conjunction with a conventional applicator, for example with the applicator mentioned in the prior art at the beginning of the text.

Amongst other things, the following examples provide exemplary embodiments of the disclosure herein:

Example 1

An applicator for the application and the embossing microprofiling of a fluidic medium on a surface, the applicator comprising a circumferentially moved die having an embossing profile, a press for the die, and a stabilizing device, in particular hardening device, for the applied medium, characterized that the applicator has a hollow support body, surrounded by the die at a distance thereby forming an gap, the press being arranged in the gap.

Example 2

The applicator according to example 1, wherein the stabilizing device is arranged in or on the support body (27).

Example 3

The applicator according to the preamble of example 1 or according to example 1 or 2, wherein the applicator has its own drive for the circumferential movement of the die.

Example 4

The applicator according to example 1, 2 or 3, wherein the applicator has a connector for a handling device, in particular for an industrial robot.

Example 5

The applicator according to one of the preceding examples, wherein the support body is tubular and has a dimensionally stable outer cover.

Example 6

The applicator according to any of the preceding examples, wherein the support body is rotatably mounted on a frame of the applicator and is connected in a rotationally locked manner with the die.

Example 7

The applicator according to one of the preceding examples, wherein the support body is coupled to the drive.

Example 8

The applicator according to one of the preceding examples, wherein the support body can be controlled or regulated.

Example 9

The applicator according to one of the preceding examples, wherein the press is designed as a deformable pressure pad filling the gap.

Example 10

The applicator according to one of the preceding examples, wherein the pressure pad has a fluidic pressure medium, in particular compressed gas in a sealed, bending elastic enclosure.

Example 11

The applicator according to one of the preceding examples, wherein the pressure pad (33), in particular the enclosure, is connected in a rotationally locked manner with the die and with the support body.

Example 12

The applicator according to one of the preceding examples, wherein the press, in particular the pressure pad, has a control for controlling or regulating the inner pressure force on the die.

Example 13

The applicator according to one of the preceding examples, wherein the die is designed as a bending elastic endless annular path.

Example 14

The applicator according to one of the preceding examples, wherein the embossing profile is arranged on the outer side of the die material or on an outer side coating of the die.

Example 15

The applicator according to one of the preceding examples, wherein the stabilizer emits a stabilizing agent, the outer cover of the support body, the press and the die being permeable for the stabilizing agent.

Example 16

The applicator according to one of the preceding examples, wherein the stabilizer is formed as a light source, in particular as a UV lamp, and the stabilizing agent is light, in particular UV light.

Example 17

The applicator according to one of the preceding examples, wherein the applicator, in particular the support body, at its edge has a local barrier against the emitted stabilizing agent.

Example 18

The applicator according to one of the preceding examples, wherein the applicator has a feeding device for the fluidic medium.

Example 19

The applicator according to one of the preceding examples, wherein the fluidic medium is designed as a hardenable varnish.

Example 20

The applicator according to one of the preceding examples, wherein the applicator has a cleaning device.

Example 21

An application device for the application and the embossing microprofiling of a fluidic medium on a surface, wherein the application device comprises an applicator and a handling device for a relative motion between the applicator and a workpiece, wherein the applicator is formed according to at least one of the examples 1 to 20.

Example 22

The application device according to example 21, wherein the handling device is formed and controlled such that it moves the applicator along the surface and in doing so presses it against the surface applying such a force that the circumferentially moved die is deformed in the pressing area and conforms to the surface and its contour in a planar manner.

Example 23

The application device according to example 21 or 22, wherein the handling device comprises a programmable multi-axis industrial robot, in particular a jointed-arm robot.

Example 24

The application device according to example 21, 22 or 23, wherein the handling device has a movable carrier having one or more movement axes for the industrial robot.

Example 25

The application device according to one of the examples 21 to 24, wherein the application device has a capturing device for the position and orientation of the applicator in the process and/or for process quality and/or the pressing force to the surface.

BRIEF DESCRIPTION OF THE DRAWINGS

The disclosure herein is illustrated in the drawings by way of example and schematically. In the drawings:

FIG. 2 shows a schematic side view of the applicator;

FIGS. 3 and 4 show end views of the applicator according to the arrows III and IV of FIG. 2;

FIG. 5 shows a longitudinal section through the applicator of FIG. 2;

FIGS. 7 to 10 show schematic illustrations of application stripes of a fluidic medium and parts of the applicator;

FIG. 11 shows a variant of the applicator; and

DETAILED DESCRIPTION

Figure 1:
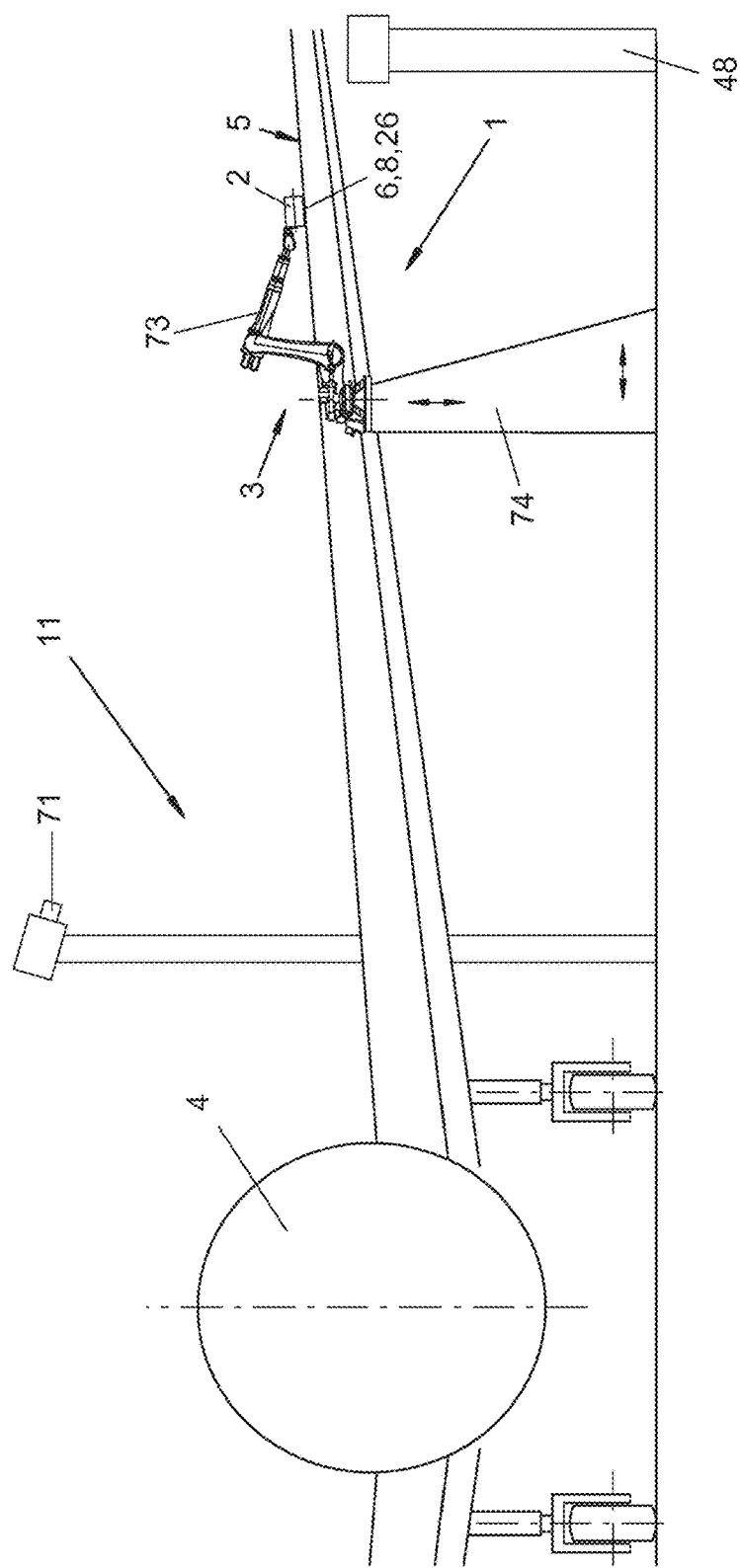
FIG. 1 shows a schematic view of an aircraft with an application device and an applicator.

The disclosure herein relates to an applicator (2) and an application method. The disclosure herein further relates to an application device (1).

The disclosure herein relates in particular to applications in the aerospace sector. This concerns in particular aircraft or other flying objects.

The applicator (2) is used to apply a fluidic medium (6) to a surface (5) and to emboss the applied medium (6) in doing so, giving it a profile (7) on its free surface. The profile (7) is preferably a microstructure having elevations and indentations, which can have low-tolerance dimensions. Application is preferably in the form of stripes, the applicator (2) and the surface (5) being moved relative to each other. This is effected by a handling device (3) of the application device (1).

The fluidic medium (6) can be formed in different ways. It may be liquid or pasty, optionally also foamy, and can consist of or comprise different materials. In the illustrated exemplary embodiment, the fluidic medium (6) can be formed as a varnish, which may consist of or comprise one or a plurality of components. The fluidic medium (6), in particular the varnish, can be designed corresponding to DE 10 2006 004 644 A1.

The workpiece (4) and the surface (5) may also be formed in different ways. In the illustrated exemplary embodiment of FIG. 1, the workpiece (4) is an aircraft. The surface (5) is the outer skin of the aircraft (4). It can have a flat or curved shape. In the exemplary embodiments shown, the applicator (2) and the application device (1) are used to varnish the aircraft (4) on the outer side.

Stabilization is required for the applied fluidic medium (6). This may be a solidification, which is achieved for instance by hardening the medium (6). Depending on the type of the medium (6) and the intended use, there may be other forms of stabilization.

The microstructure (7) on the free media surface may be designed differently and serve different purposes. In an aircraft (4), a design in the form of sharkskin is of advantage. FIGS. 7 to 10 show such a microstructure (7) schematically. The elevations and depressions can be shaped like a profile and extend in the direction of application or the application path (8). Such a microstructure (7) or riblet can be used to reduce the air resistance and thus the fuel consumption of an aircraft (4).

In the exemplary embodiments shown, the applicator (2) is an application tool for the fluidic medium (6). To generate the relative movement, the applicator (2) is moved by the handling device (3) relative to a stationary workpiece (4) in the exemplary embodiments. The kinematic allocation may be reversed in a different embodiment. The handling device (3) shown in FIG. 1 for example consists of or comprises a multi-axis industrial robot (73), which holds and guides the manipulator (2) for media application. The industrial robot (73) can have any number and arrangement of rotational and/or translational robot axes and has a robot controller (not shown). The industrial robot (73) is preferably formed as a jointed-arm robot or articulated robot having five or more axles.

The industrial robot (73) can be arranged stationary. In large-volume workpieces (4), the industrial robot (73) can be arranged in or on a carrier (74) in any, but in particular in a suspended or upright position. The carrier (74) may be mobile, wherein it has one or a plurality of controllable motion axes having corresponding drives, which are schematically indicated as arrows in FIG. 1. The carrier (74) can, for example, be a lifting platform that can be moved on the ground. The lifting platform may comprise a conveyor device that is omnidirectional movable on the ground and also rotatable, on which a lifting device adjustable at least in height, and possibly also in further axes is arranged. Such a conveyor may be formed in accordance with EP 2 137 053 B1 and can have plurality of Mecanum wheels. It may be steerable and can be operated by remote control. Alternatively, it can independently travel along a pre-programmed track and in doing so capture the current driving environment for control purposes and for collision avoidance.

The carrier (74) can, for example, be movable in the three translational spatial axes. It may also have spatial axes of rotation. Furthermore, it can be moved jointly and in a coordinated manner with the industrial robot (73), in doing so it is connected, for instance, to the robot controller or to another higher-level control.

The application device (1) forming an application device in the exemplary embodiments can have a capturing device (11), which can serve various purposes. It can be used for the exact positioning and orientation of the applicator (2) in the process and/or monitor these. For this purpose the capturing device (11) can for instance comprise the measuring device (71) shown in FIG. 1, which interacts with one or more calibration marks (72), for example so-called 6D probes, at the applicator (2) and thereby captures the position and orientation of the applicator (2) in space during the process and during the relative movement. The measuring device (71) can for example have a digital scanning camera or a laser tracker or any other suitable measuring unit. The measuring device (71) preferably operates without contact and optically.

The industrial robot (73) can be connected to the applicator (2) via a quick coupling device. In this way, if necessary, it can change the applicator (2) and pick up another applicator (2) or another tool. The application device (1) may further have the replacement device (48) for a die (22) of the applicator (2) schematically shown in FIG. 1, which is arranged in the working area of the industrial robot (73) and will be described in more detail below.

A preferred embodiment of the applicator (2) is shown in FIGS. 2 through 16. The applicator (2) has an application device (14) for the fluidic medium (6) and a stabilizing device (15) for the medium (6), which is formed, for example, as a hardening device. The applicator (2) may further have a feeding device (16) for the fluidic medium (6) and optionally also a cleaning device (17).

The applicator (2) comprises a frame (13) on which a connector (18) for the connection with the power takeoff element of the handling device (3), in particular of the industrial robot (73), is arranged. The frame (13) may be formed as a housing (19) or may have such a protective housing. The frame (13) may also have a supporting device (20) for device components, which is explained below and shown in FIGS. 12 through 16, that facilitates die change and also allows its automation.

The applicator (2) has a circumferentially moving die (22), which on its outer side (24) has an embossing profile (25) for mechanically embossing the fluidic medium (6) upon application on the surface (5) using a pressing force and obtaining the profile (7) and the microstructure. The die (22) is designed as a flexurally elastic and endless annular path (23). It is preferably formed having high tensile and ductile strength. It can consist of any suitable material, for instance a plastic, in particular silicone. In a tensile rigid embodiment the embossing profile (25) may have a precisely predetermined arrangement and form that is maintained during application and embossing. In case of lower tolerance requirements, the die (22) can have a certain tensile and ductile elasticity. The closed annular path (23) can have the shape of a tube or sleeve. Their cross-sectional geometry in the exemplary embodiments shown is circular in the starting position. Alternatively other shapes are possible, which will be described below.

The embossing profile (25) can be arranged directly on the outer side (24) of the die (22) or the annular path (23). The embossing profile (25) can be incorporated in the outer surface (24) in any suitable manner. In another alternative embodiment, the die (22) can have a coating on the outside (24), consisting of or comprising for instance glass or another durable material and bearing the embossing profile (25) on its own outer surface.

The applicator (2), in particular its application device (14), also has a support body (27), which is disposed within the die (22) at a radial or transverse spacing. The die (22) surrounds the support body (27), preferably surrounding it on all sides. As a result of the distance a gap (31) is formed. The applicator (2), in particular the application device (14) also comprises a press (32) for the die. The press (32) is arranged in the gap (31) and acts from the inside on the surrounding die (22) and exerts a pressure force on the latter.

When media are applied, the applicator (2) of the handling device (3) is pushed, in particular by the programmable industrial robot (73), against the surface (5) using a defined and adjustable force. In doing so, the die (22) with its outer side contacts the substrate (5) and is deformed by the infeed or pressing force. For that reason it is flattened in the contact area and forms an extended pressing area (26). The latter clings to the possibly contoured surface (5). FIGS. 3 and 4 show this embodiment.

The die (22) moving circumferentially and in particular rotationally about a transversely directed axis receives the fluidic medium (6) from a feeding device (16) using the embossing profile (25), moves it using the circumferential or rotational movement according to the arrow in FIG. 4 towards the surface (5) and transfers it at the pressing area (26) onto the surface (5), thereby embossing the profile (7) by the action of the infeed or pressing force. For the relative movement of the process direction or feed direction symbolized in FIG. 4 by an arrow, the circumferentially moving die (22) rolls off on the surface (5) at a progressive feed. The deposited and profiled medium (6) is stabilized in the pressing area (26) using the stabilizing device (15) described below.

The circumferential movement of the die (22) is generated by the relative movement and/or the feed in the process direction (12) due to frictional contact and rolling off on the surface (5). In the illustrated and preferred embodiment the applicator (2) additionally has its own drive (44) for the circumferential movement of the die (22). The drive (44) can be controlled or regulated, and may also be connected to the control, in particular to the robot control. In the embodiments shown, the support body (27) is rotatably mounted on a bearing (40) on the frame (13) of the manipulator (2). The support body (27) is connected to the die (22) in a rotationally locked manner. The rotationally locked connection may for instance be formed by the press (32) described in more detail below. In the embodiments shown, the drive (44) is coupled to the support body (27), such that the die (22) is indirectly driven and entrained by the rotational lock upon rotation of the support body (27).

As illustrated in FIGS. 2 through 6, the support body (27) is tubular in the illustrated embodiments and has a dimensionally stable outer cover (28). The support body (27) preferably has a cylindrical shape with a circular cross section, rotating around a central axis (30) fixed to the frame. The rigid outer cover (28) can support the pressure forces on the die (22) exerted by the press (32).

The support body (27) is designed preferably hollow and has the aforementioned preferred cylindrical or tubular shape. The stabilizing device (15) is accommodated in the interior of the hollow support body (27). It emits a stabilizing agent (50) towards the pressing area (26) and to the fluidic medium (6) just applied there. In the exemplary embodiments shown, the medium (6) in the form of varnish is hardened. The stabilizing device (15) has a light source (49) for this purpose that is, for example, formed as a UV lamp. The stabilizing agent (50) or light rays symbolized by arrows penetrate the outer cover (28) of the support body (27), the gap (31) comprising the press (32) and the die (22), which are correspondingly formed translucent.

The light (50) emitted towards the surface (5) preferably acts on the entire or at least a large part of the pressing surface (26) and hardens the fluidic medium (6) located between the die (22) and the substrate (5). For the relative movement in the feed direction (12) the pressing surface (26) results in a duration of action of the stabilizing agent (50), ensuring an adequate stabilization, in particular solidification of the medium (6) and of the profile and/or of the microstructure (7). The remaining stabilization, in particular solidification or hardening may occur after the media has been applied exposed to air.

The stabilizing device (15), in particular the light source (49) can be arranged and housed in the hollow support body (27). It can be rigidly connected to the frame (13). But it can also protrude axially on one or both front ends of the support body (27). The stabilizing device (15), in particular the light source (49) has a power supply (51). It can also have a disposal (52) for pollutants, such as for the ozone generated during hardening. The disposal (52) may, for instance, include an extraction by suction system. The power supply (51) and disposal (52) may be connected with corresponding additional equipment at the industrial robot (73) or elsewhere. For controlling the stabilizing device (15), in particular the light source (49), various measurement and control devices can be present. For instance a moisture meter (53), in particular a hygrometer, and a thermometer (54) are present. They are shown in the constructive embodiment of the applicator (2) illustrated in FIGS. 12 through 16.

The press (32) can be formed in different ways. It is arranged in the for instance annular space (31) between the outer cover (28) of the support body (27) and the die (22) or the annular path (23). In the exemplary embodiments shown, the press (32) is formed as a deformable pressure pad (33) filling the gap (31). The pressure pad (33) can be formed in different ways. In the exemplary embodiments shown, it has a fluidic pressure medium (35) in a sealed and bending elastic enclosure (34). The pressure medium (35) is for instance a pressure gas, in particular compressed air. The internal pressure in the pressure pad (33) is significantly higher than the ambient pressure, so that the pressure pad (33) develops from the inside a pressing force against the surrounding die (22).

The pressure pad (33) is connected in a rotationally locked manner to the support body (27) and the die (22). It is used to transmit the driving and rotational movement of the drive (44) from the support body (27) via the pressure pad (33) to the die (22). The rotationally locked connection between the pressure pad (33) and the surrounding die (22) is effected by friction and a force-fit connection. Alternatively or additionally, a corresponding contouring of the contact surfaces can result in a positive lock. The rotationally locked connection is provided in particular via the enclosure (34) of the pressure pad (33).

Figure 6:
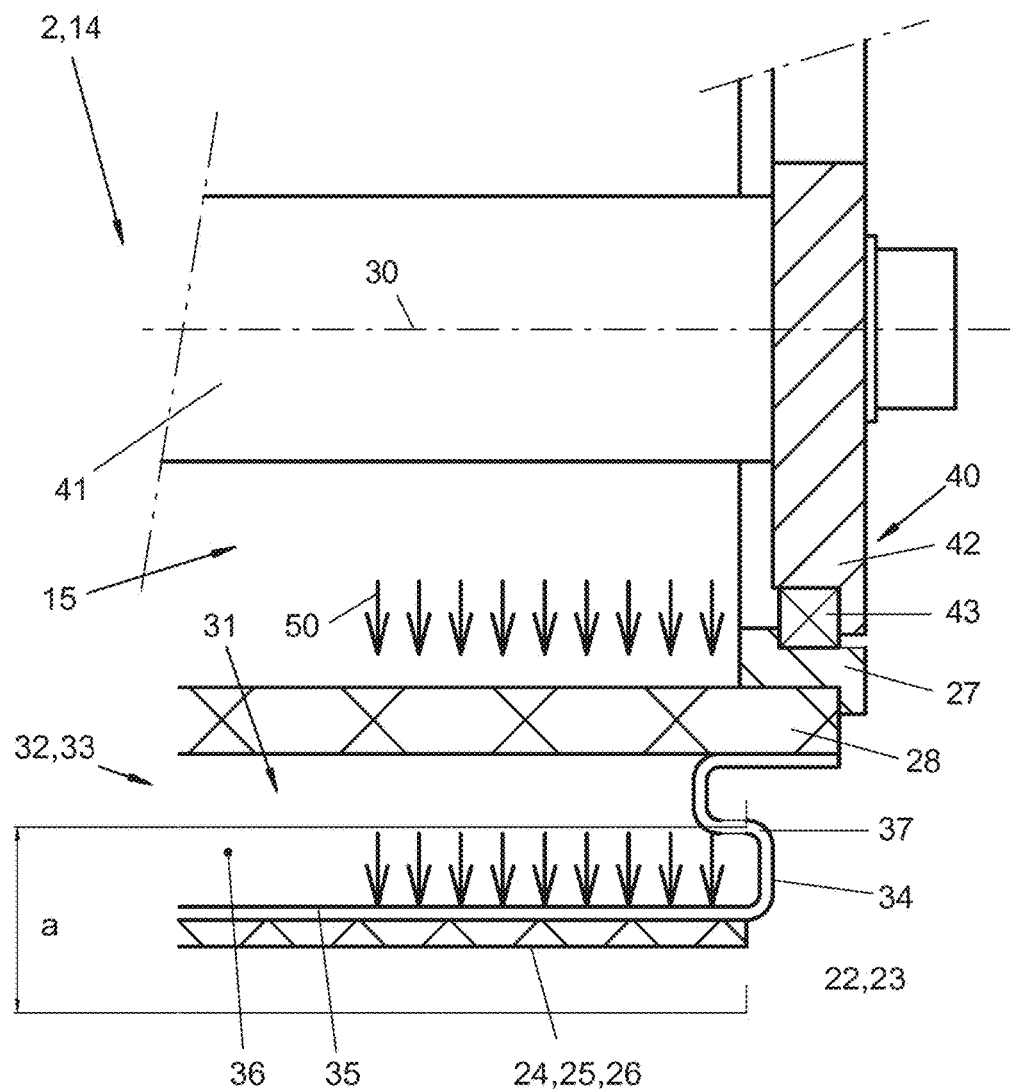
FIG. 6 shows a broken-off and enlarged detail VI of FIG. 5.
Figure 12:
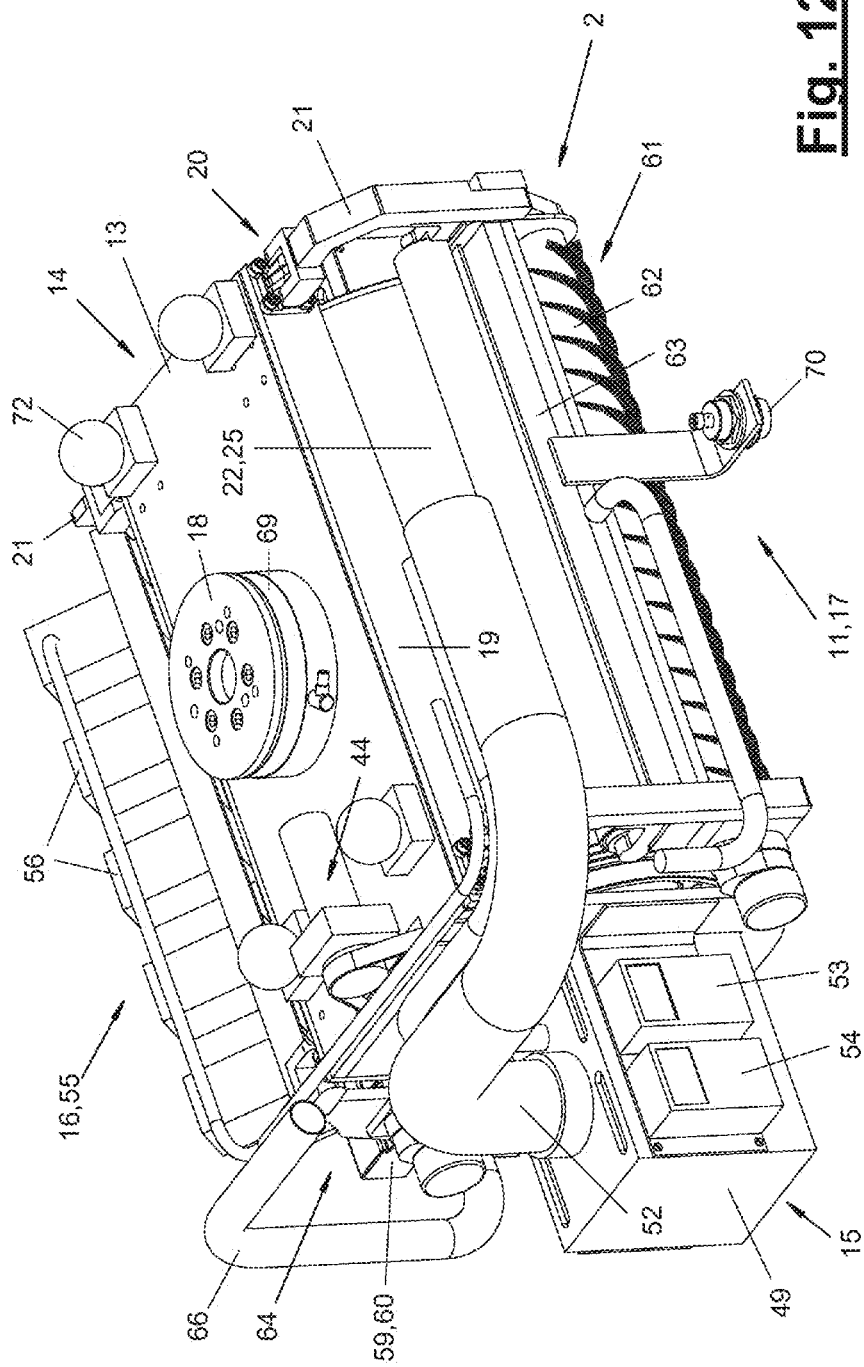
FIGS. 12 to 16 show a preferred embodiment of the applicator in various views.
Figure 13:
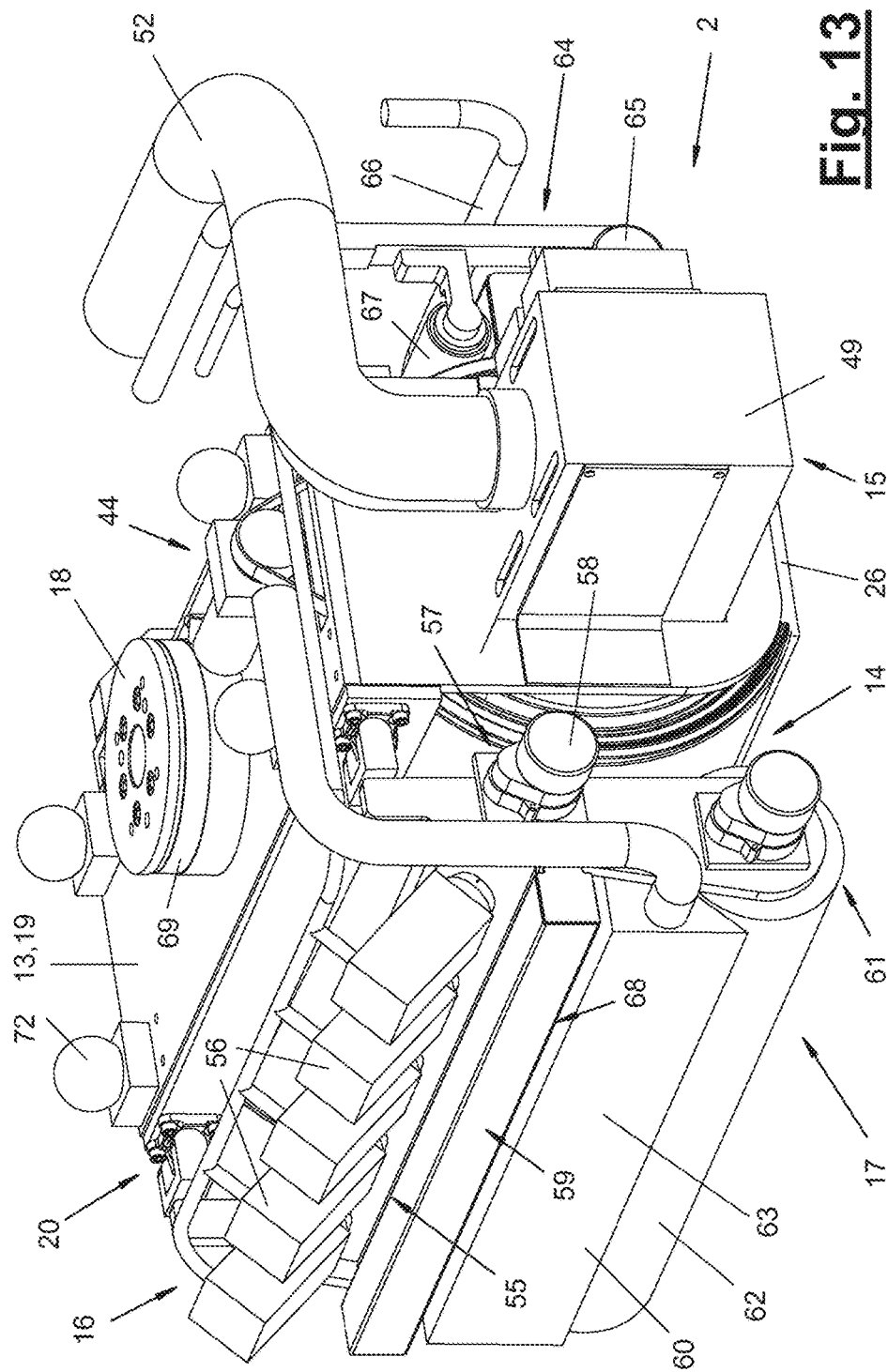

As FIGS. 5 and 6 illustrate in detail, the enclosure (34) is tubular. It consists of or comprises a suitable bending elastic material, for instance a plastic film. The enclosure (34) also has a certain tensile and ductile elasticity. The flexural rigidity and, for example, the wall thickness of the die (22) or the annular path (23) are higher than the flexural rigidity of the enclosure (34).

The enclosure (34) consists of or comprises for instance an annular pre-cut part, the edges of which are folded and firmly and tightly connected, for instance glued, to the outer cover (28) of the support body (27). In this way, the tube-like enclosure (34) is covered by an initially cylindrical shell outer cover (36) forming the periphery of the enclosure (34). Further, there are sidewalls (37), which have a design favorable to deformation. They are for instance bent in the Z- or S-shaped manner shown in FIG. 6. Alternatively or additionally, there may be a corresponding material formation in the sidewall region.

For that reason, the enclosure (34) and in particular the shell outer cover (36) can be deformed in the pressing area (26) and converge to the dimensionally stable enclosure (28) of the support body (27). Upon exposure to the internal pressure of the pressure medium (35), for instance compressed air, the enclosure (34) is then again outwardly deformed. This results in the workspace (a) shown in FIG. 6. The workspace and the thus co-determined width of the planar pressing area (26) in the feed direction (12) can be set and optionally controlled or regulated via the infeed and pressing of the applicator (2) and the die (22) onto the surface (5) exerted by the handling device (3). This can also be performed as a function of the required exposure time of the stabilizing agent (50), for instance of the UV light.

FIGS. 3 through 6 illustrate the mounting (40) of the roller-like support body (27) on the frame (13). To this end, in the interior of the hollow support body (27) a supporting structure (41) is arranged, which is rigidly connected to the frame (13) and supported there. Bearing flanges (42) fastened at the support structure (41) are arranged on the end-face edge regions of the support body (27) and bear a bearing (43), for instance a flat annular bearing, on the outside. This in turn is connected to the support body (27). The stabilizing device (15), in particular the light source (49), can also be mounted to the support structure (41) and positioned fixed or adjustable.

The above-mentioned drive (44) is arranged on the frame (13). It comprises a motor (45), for instance an electric motor, and a belt drive (46) or another suitable transmission for connecting the motor sprocket to a propulsion or propulsion device (47) on the support body (27). The propulsion (47) can for instance be formed by a gear on the outer periphery of the support body (27) that is cylindrical at least in this area and is preferably arranged at the rear edge region of the support body (27).

The expansive force of the press (32) can be controlled or regulated. For this purpose it has a suitable control (38), which is indicated in FIG. 5. For the shown configuration of the press (32) using a pressure pad (33), the control (38) may comprise a controllable valve (39) and a pressure medium supply (not shown). It can be used to supply or drain the pressure medium (35), in particular a pressure gas. A supply will increase the internal pressure in the desired manner. A fluidic, in particular gaseous, pressure medium (35) has the advantage that there is a constant pressure and a constant pressure force resulting therefrom in the pressure area (26). If the die (22) or the embossing profile (25) is worn, the die (22) can be exchanged. For this purpose, for instance, the pressure medium (35) can be drained and the internal pressure of the pressure pad (33) can be decreased, so that the die (22) can be removed at the above-mentioned replacement device 48), and a new die (22) can be mounted and attached.

FIG. 7 through 10 illustrate the media application in several steps and using broken-off sectional representations. The application stripes (8) are placed side by side exactly in parallel, having a defined spacing on the surface (5). The application paths (8) can be fully or partially stabilized across their width during application. FIGS. 7 to 8 also illustrate the case where the width of the die (22) can be greater than the width of the application path (8), the embossing profile (25) also extending only over a partial area of the width of the die (22). At an edge region of the die (22) a barrier (29) may be arranged circumferentially, which prevents the passage of the stabilizing agent (50), in particular the UV light. On the opposite side, the die (22) can protrude beyond the embossing profile (25) and the application area. In the area of the barrier (29), the fluidic medium (6) is entrained by the die (22) and applied to the surface, but it is not stabilized during application. The result is the unbonded region (10), which is also called wet area as illustrated in the drawings. In the other areas, the applied fluidic medium (6) can be stabilized and particularly hardened, resulting in the solidified structural area (9) depicted in the drawings. The unbonded region (10) is stabilized and solidified or hardened upon application of the adjacent application stripe (8). This is done by the edge of the die located axially opposite the barrier (29) and protruding laterally beyond the embossing profile (25) and the local passage of the stabilizing agent (50). At the same time another unbonded area (10) is created at the next application stripe (8). During the subsequent solidification this area (10) enters into an integral connection with the other previously solidified structural areas (9). The adjacent edge regions of the application paths (8) are designed as elevations in FIGS. 7 through 10. Alternatively, there may be depressions.

FIG. 11 shows a variant of the application device (1). Here, two or more applicators (2) are arranged side by side and behind each other having an offset in the feed direction. They are located on a common mount (75), which is connected via a connector (18) to the handling device (3), in particular the industrial robot (73). The mount (75) has two or a plurality of mounting arms (76), which are connected at the ends by articulated connections or the like to the connectors (18) of the applicators (2). The relative position of the applicators (2) can be changed by an adjusting device (77) on the mount (75). In this way, the inclination and possibly even the spacing of the mounting arms (76) can be specifically adjusted and, if necessary, altered.

FIGS. 12 through 16 show a constructive embodiment of the applicator (2). It is formed according to the exemplary embodiments of FIGS. 2 through 6 described above. The constructive exemplary embodiments also illustrate the feeding device (16) and the cleaning device (17).

Figure 14:
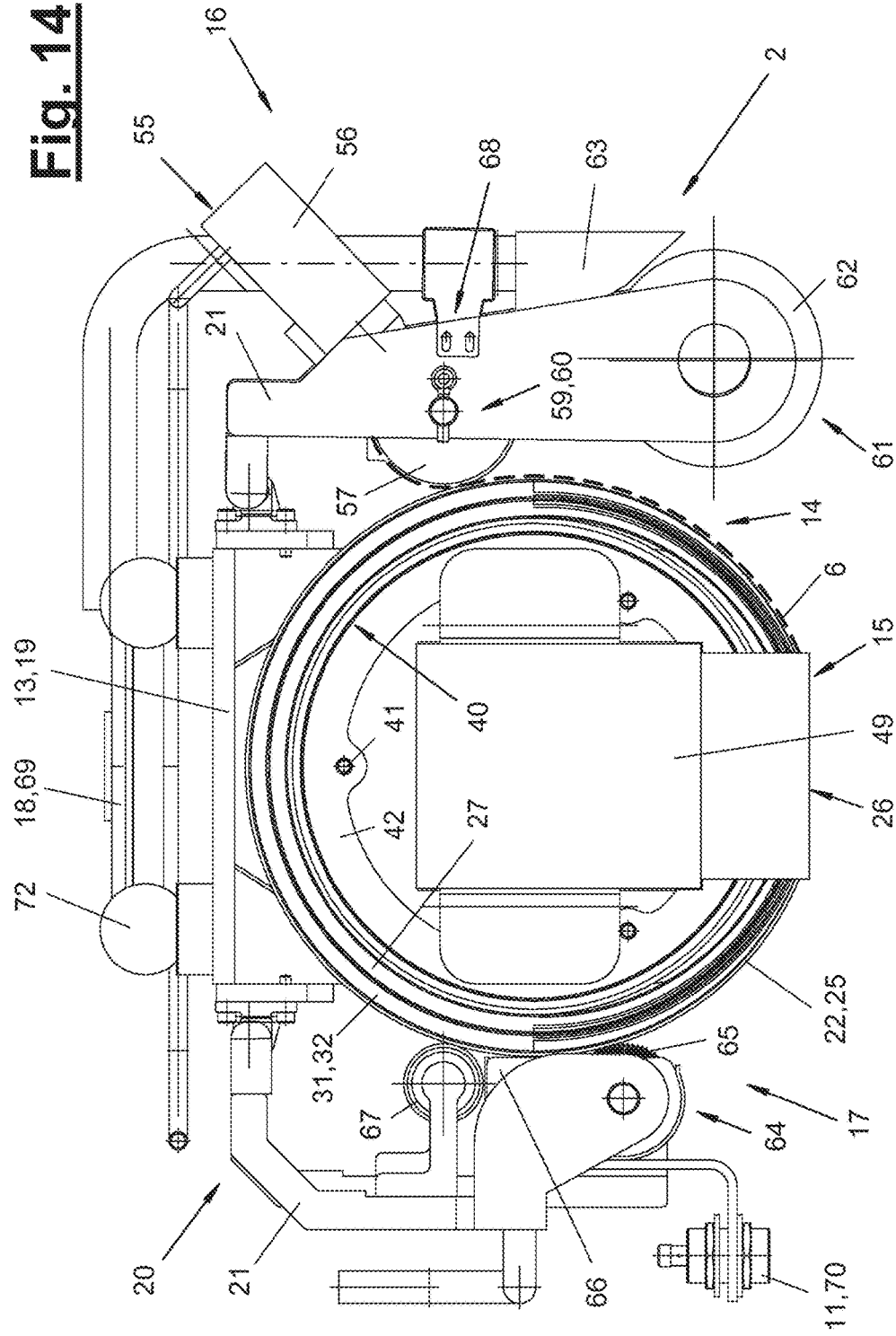
Figure 15:
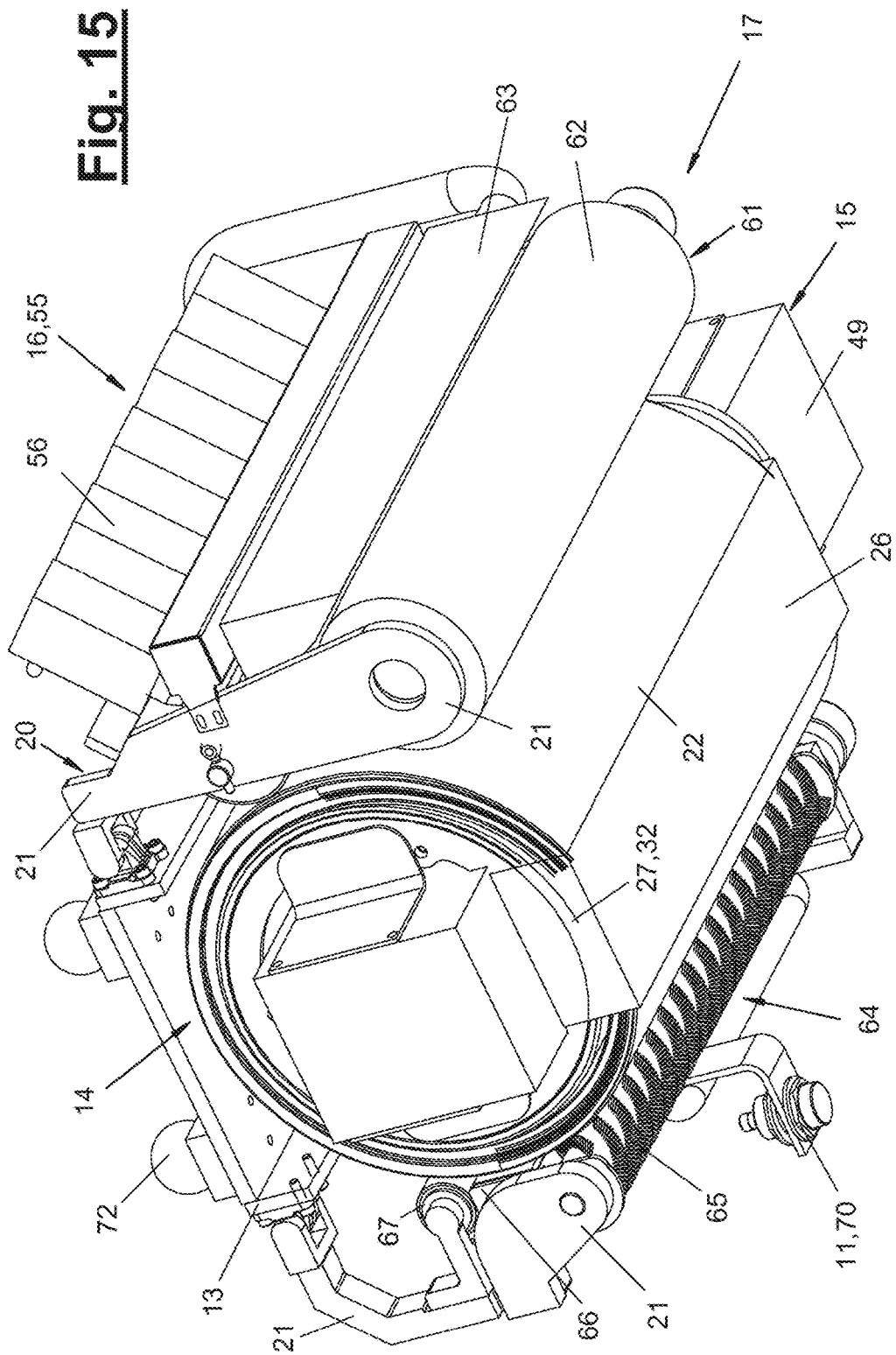
Figure 16:
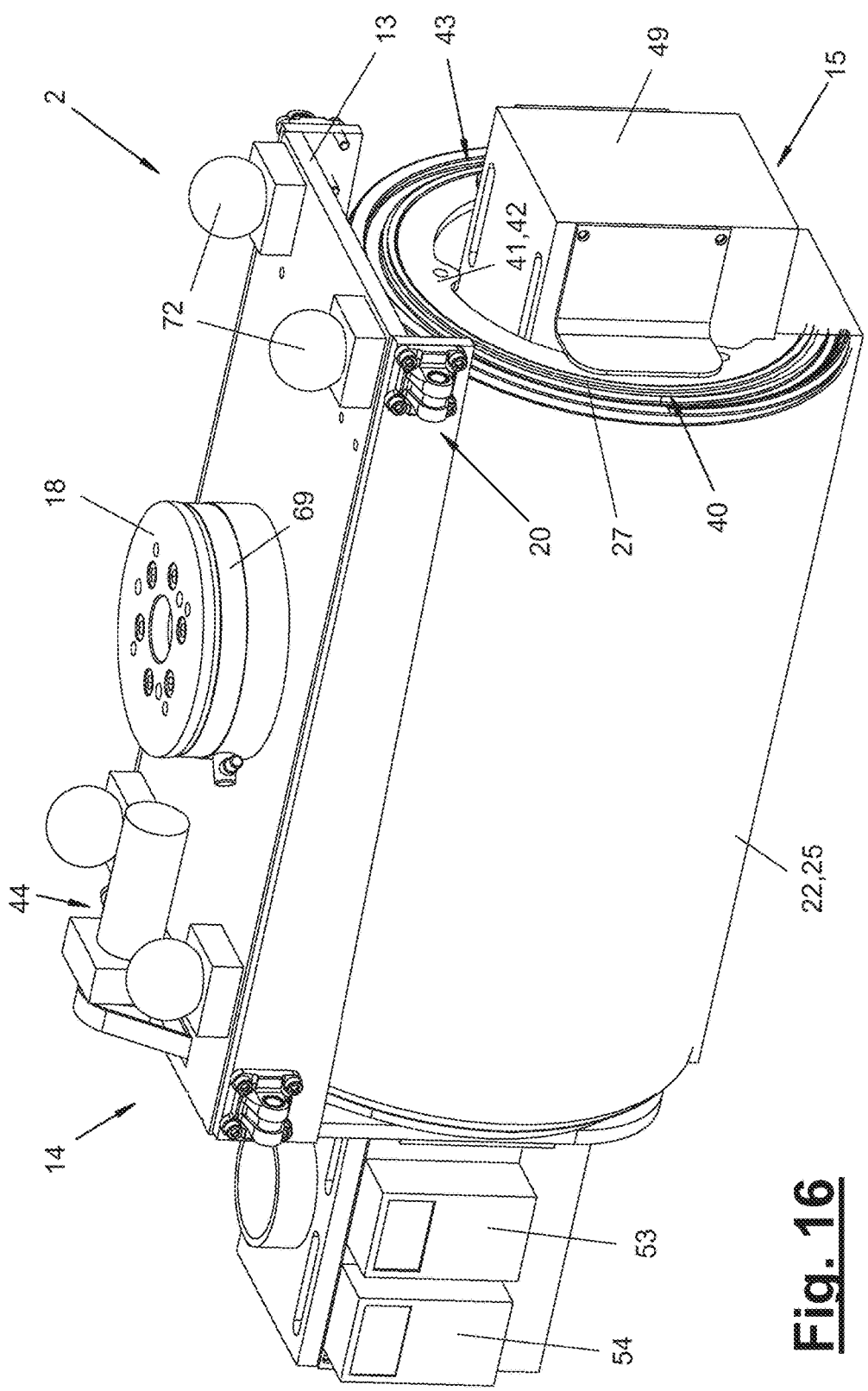

The feeding device (16) is connected to an external media supply (not shown) or may have an attached reservoir. It has a metering device (55) for the media application. For this purpose, for instance a plurality of applicator nozzles (56) arranged along the axis (30) is provided, which dispense a quantity of fluid in a controlled or regulated manner. The fluid transfer to the die (22) can be effected via a distribution roller (57) disposed between the applicator nozzles (56) and the die (22), which may be equipped with a controllable or optionally regulatable drive (58), which may in turn be connected to the aforementioned control, in particular the robot control. FIG. 14 shows the arrangement and schematically illustrates the transfer of the fluidic medium (6) to the die (22) and its embossing profile (25).

The feeding device (16) may further have a disposal device (59) for media residue. It has, for instance, a scraper or another suitable eroding mechanism to remove media residue from the outer cover of the distribution roller (57) and collect it in a container or the like. The disposal device (59) may further have an extraction by suction system (60) or other means for carrying-off the media residue. The disposal device (59) may further have a separate media container into which medium (6) can be dispensed during process breaks in order to prevent premature hardening in the feed area.

The cleaning device (17) may be designed to have multiple parts. It has, for instance, a cleaner (61) for the surface (5). This consists of or comprises for instance a rotationally mounted brush (62) possibly driven by its own drive in a controlled or regulated manner. The brush (62) may be allocated to a disposal (63), which is designed for instance as an extraction by suction system for the collected debris or the like. The cleaner (61) for the surface can be arranged in the feed direction (12) in front of the die (22) and below the feeding device (16).

The cleaning device (17) may further have a cleaner (64) for the die (22). This can be arranged at the rear applicator end in feed direction (12). It comprises, for example, a roller-shaped brush (65) inclined against the outside (24) of the die (22), which is also rotationally driven and may possibly be controlled or regulated. The brush (65) may be allocated to a disposal (66) for the media residue removed from the die (22), which is designed for instance as an extraction by suction system. Further, above the brush (65) an electrostatic roller (67) or an adhesion roller can be disposed and inclined against the die (22) on the outside, which removes further and possibly still adherent media particles and which is possibly connected to the disposal (66).

The cleaning device (17) may further have a cleaner (68) for the media supply (16). This may be the aforementioned disposal device (59) or another device.

FIGS. 12 through 16 also illustrate further components of the capturing device (11). This includes, for instance, a load sensor (69) for the measurement of the infeed or pressing force acting during media acting application. The load sensor (69) can, for instance, be arranged at the connector (18) or at another suitable place, possibly also on the industrial robot (73). It may be configured as a force/torque sensor. The load sensor (69) is connected to the control, in particular the robot control.

The capturing device (11) may further have a verification sensor (70), which is for instance used for verifying the quality of the applied fluidic medium (6) and possibly also for verifying the quality of the microstructure (7). It may also be arranged on the rear of the applicator in the feed direction (12) and be connected to the frame (13) in a suitable manner. The sensor (70) is designed for instance as an optical sensor, a proximity sensor or in another suitable manner. The capturing device (11) may further include one or more additional sensors for operating states or the like of the application device (1) and its components.

Modifications of the shown and described exemplary embodiments are possible in various ways, in particular the characteristics of the described exemplary embodiments and the named modifications may be combined with each other and possibly even interchanged.

In a variant not shown, the support body can be arranged stationary and supported on the frame (13), wherein the die (22) is moved circumferentially around the support body in the manner of a caterpillar track. The drive (44) can also act directly on the die (22), which, for this purpose, has a propulsion or propulsion structure (47) on the edge on suitable supporting points. Furthermore, the stabilizing device (15) can be arranged in or on the support body (27). A stationary support body (27) may to this end correspondingly be formed hollow. The press (32) is formed in a corresponding manner for a stationary support body (27) and circumferential die and permits the rolling or circumferential movement.

Varying from the illustrated exemplary embodiments, a pressure medium (35) may be formed in other ways, for instance, as another fluid. It can, for instance, have a liquid or paste-like consistency and consist of or comprise for instance a gel.

Other variations are possible with regard to the stabilization of the fluid medium (6). Stabilization, in particular solidification or hardening can be conducted in other ways, for instance, by heat, radiation, alternating electrical fields or the like. The stabilizing agent (50) is designed accordingly. The permeability of the support body (27) of the gap (31) having the press (32) and the die (22) is then modified and adjusted accordingly.

While at least one exemplary embodiment of the present disclosure(s) herein is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF THE REFERENCE NUMERALS 1 application device, applicating device
2 applicator, applying tool
3 handling device
4 workpiece, aircraft
5 substrate, aircraft skin
6 medium, varnish
7 microstructure, profile
8 application stripe
9 solidified structural area
10 solidified area, wet area
11 capture device
12 process direction, feed direction
13 frame
14 application device for medium
15 stabilizing device, hardening device
16 feeding device for medium
17 cleaning device
18 robot connector
19 housing
20 supporting device
21 supporting arm, pivot arm
22 die
23 sleeve, annular path
24 outer side
25 embossing profile, counter profile
26 pressing area
27 support body, roller
28 outer cover
29 barrier, cover
30 axis
31 gap
32 press
33 pressure pad
34 enclosure, tube
35 pressure media, compressed air
36 shell outer cover, tube outer cover
37 sidewall
38 control
39 valve
40 storage
41 support structure
42 bearing flange
43 bearing, annular bearing
44 drive
45 motor
46 belt drive
47 propelling agent, gear
48 replacement device for die
49 light source, UV lamp
50 stabilizing agent, light beam
51 power supply
52 disposal, extraction by suction system
53 humidity meter, hygrometer
54 thermometer
55 metering device
56 applicator nozzle
57 distribution roller
58 drive
59 disposal device media residue
60 extraction by suction system
61 cleaner for substrate
62 brush
63 disposal, extraction system
64 cleaner for die
65 brush
66 disposal, extraction system
67 electrostatic roller
68 cleaner for media supply
69 load sensor, force/torque sensor
70 sensor, test sensor
71 measuring device, measuring camera, laser tracker
72 calibration mark
73 industrial robot
74 carrier
75 mount
76 mounting arm
77 adjusting device
a work area

The invention claimed is:
1. An applicator for applying and embossing a microprofile on a fluidic medium on an outer skin of an aircraft, the applicator comprising:
a circumferentially movable die comprising an embossing profile for embossing the microprofile in the fluidic medium on the outer skin of the aircraft;
a press for the die;
a fluidic medium stabilizer;
a frame comprising a connector configured to connect with a power takeoff element arranged thereon, wherein the frame is connected in a rotationally locked manner to the die; and
a feeding device mounted on the frame;
wherein the die is configured to receive the fluidic medium from the feeding device using the embossing profile when the die moves circumferentially,
wherein the applicator is configured to roll the die over the outer skin of the aircraft to transfer the fluidic medium to the outer skin of the aircraft, and wherein the applicator comprises a hollow support body, surrounded by the die at a distance, thereby forming a gap, the press being arranged in the gap, and the support body being rotatably mounted on the frame of the applicator.

2. The applicator according to claim 1, wherein the stabilizer is arranged in or on the support body.

3. The applicator according to claim 1, wherein the applicator comprises a connector for a handling device.

4. The applicator according to claim 3, wherein the handling device is an industrial robot.

5. The applicator according to claim 1, wherein the support body is tubular and has a dimensionally stable outer cover.

6. The applicator according to claim 1, wherein the applicator has its own drive for circumferential movement of the die and the support body is coupled to the drive.

7. The applicator according claim 1, wherein the support body can be controlled or regulated.

8. The applicator according claim 1, wherein the press is formed as a deformable pressure pad filling the gap.

9. The applicator according to claim 8, wherein the pressure pad is connected in a rotationally locked manner with the support body and with the die.

10. The applicator according claim 8, wherein the pressure pad comprises a fluidic pressure medium in a sealing, bending elastic enclosure.

11. The applicator according to claim 10, wherein the fluidic pressure medium is a pressure gas.

12. The applicator according claim 1, wherein the press comprises a control for controlling or regulating an inner pressure force on the die.

13. The applicator according to claim 1, wherein the die is formed as a bendable elastic endless annular path.

14. The applicator according to claim 1, wherein the embossing profile is arranged on an outer side of the die or on an outer side coating of the die.

15. The applicator according claim 1, wherein the stabilizer is configured to emit a stabilizing agent, wherein an outer cover of the support body, the press, and the die are permeable for the stabilizing agent.

16. The applicator according claim 15, wherein the stabilizer comprises a light source and the stabilizing agent comprises light.

17. The applicator according to claim 16, wherein the light source is a UV lamp and the stabilizing agent is UV light.

18. The applicator according to claim 15, wherein the applicator, at an edge thereof, has a local barrier for the stabilizing agent.

19. The applicator according to claim 1, wherein the fluidic medium comprises a hardenable varnish.

20. The applicator according claim 1, wherein the applicator comprises a cleaning device.

21. An application device for applying and embossing a microprofile on a fluidic medium on an outer skin of an aircraft, the application device comprising an applicator according to claim 1, wherein the application device is configured to allow a relative motion between the applicator and the outer skin of the aircraft.

22. The application device according to claim 21, wherein the application device is configured to move the applicator along the outer skin of the aircraft and, in doing so, to press the applicator against the outer skin of the aircraft to apply a force configured to deform the circumferentially moved die in a pressing area, which is a contact area between the die and the outer skin of the aircraft, and to conform to the outer skin of the aircraft and a contour thereof in a planar manner.

23. The application device according to claim 21, wherein the application device comprises a multi-axis programmable industrial robot for the relative motion between the applicator and the outer skin of the aircraft.

24. The application device according to claim 23, wherein the multi-axis programmable industrial robot comprises a jointed-arm robot.

25. The application device according to claim 23, comprising a movable carrier having one or more movement axes for the multi-axis programmable industrial robot.

26. The application device according to claim 21, wherein the application device is configured to measure a position and orientation of the applicator in a process, for a process quality, or a pressing force to the substrate.

* * * * *